(12) United States Patent
Yu et al.

(10) Patent No.: US 12,564,180 B1
(45) Date of Patent: *Mar. 3, 2026

(54) INTELLIGENT FISHING REEL

(71) Applicant: SHENZHEN BOSAIDONG TECHNOLOGY CO., LTD, Shenzhen (CN)

(72) Inventors: Zhiyuan Yu, Shenzhen (CN); Le Xiao, Shenzhen (CN); Tianshi Cui, Shenzhen (CN)

(73) Assignee: SHENZHEN BOSAIDONG TECHNOLOGY CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,323

(22) Filed: Dec. 16, 2024

Related U.S. Application Data

(63) Continuation of application No. 18/822,303, filed on Sep. 2, 2024, now Pat. No. 12,201,100.

(51) Int. Cl.
*A01K 89/015* (2006.01)

(52) U.S. Cl.
CPC .................................. *A01K 89/015* (2013.01)

(58) Field of Classification Search
CPC ..................................................... A01K 89/015
See application file for complete search history.

(56) References Cited

FOREIGN PATENT DOCUMENTS

| | | |
|---|---|---|
| CN | 118314627 | 7/2024 |
| JP | 7678054 B2 * | 5/2025 |

* cited by examiner

*Primary Examiner* — Richard G Davis

(57) ABSTRACT

A fishing reel is provided. The fishing reel includes one or more sensors that can obtain data of the fishing reel in a first movement. The fishing reel also includes a computing device. The computing device can estimate a casting posture of a user of the fishing reel from a plurality of casting postures, based on the data of the fishing reel and a model classifying the plurality of casting postures. The casting posture corresponds to the first movement. The computing device can control an operation of the fishing reel based on the casting posture of the user, and transmit data of the casting posture to a separate device.

14 Claims, 5 Drawing Sheets

100

300

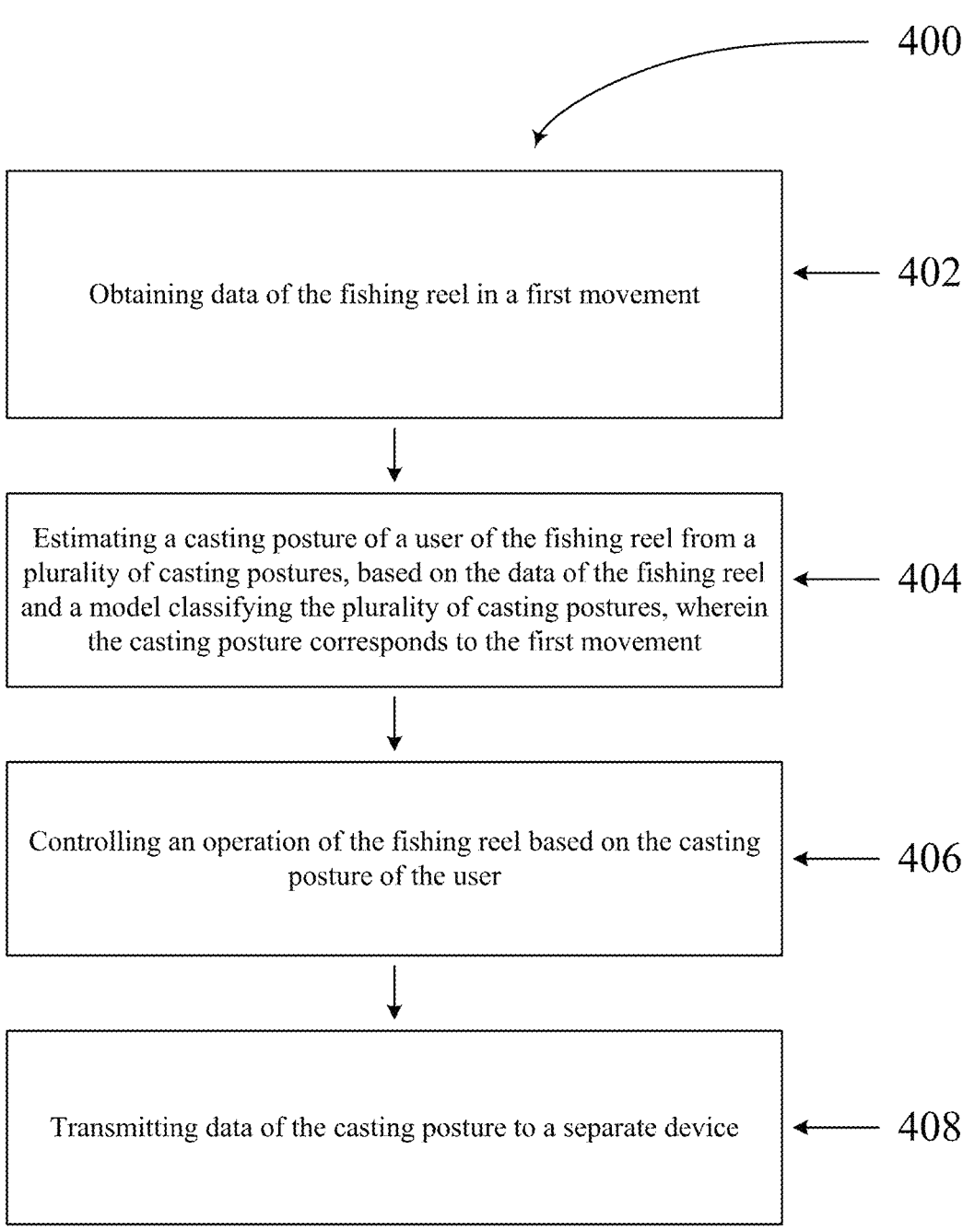

400

Obtaining data of the fishing reel in a first movement ← 402

Estimating a casting posture of a user of the fishing reel from a plurality of casting postures, based on the data of the fishing reel and a model classifying the plurality of casting postures, wherein the casting posture corresponds to the first movement ← 404

Controlling an operation of the fishing reel based on the casting posture of the user ← 406

Transmitting data of the casting posture to a separate device ← 408

FIG. 4

INTELLIGENT FISHING REEL

TECHNOLOGICAL FIELD

The present disclosure relates generally to an intelligent fishing reel, and in particular, to an intelligent fishing reel that can control itself and improve a user's experience based on an estimated posture of the user.

BACKGROUND

In fishing scenarios, a user of a fishing reel may encounter various operational issues relating to the user's fishing technique. One of these operational issues for the user may be the difficulty in achieving an accurate casting posture in a specific fishing scenario. The inaccurate or wrong casting posture may cause a failure to brake the fishing reel, frequent line backlash or tangling or even damage to the fishing reel.

Therefore, it would be desirable to have a device and method that takes into account at least some of the issues discussed above, as well as other possible issues.

BRIEF SUMMARY

Example embodiments of the present disclosure are directed to an intelligent fishing reel that can control itself and improve a user's experience based on an estimated posture of the user. Example embodiments provide a fishing reel that can estimate a user's casting posture, and based on the estimated casting posture, the fishing reel can control an operation of itself such as implementing a braking mode to the fishing reel in the casting movement or generating an alarm that the estimated casting posture may cause damage to the fishing reel.

The present disclosure thus includes, without limitation, the following example embodiments.

Some embodiments provide a fishing reel. The fishing reel comprises one or more sensors configured to obtain data of the fishing reel in a first movement; and a computing device comprising a memory and a processor, wherein the memory stores executable instructions that, in response to execution by the processor, cause the computing device to at least: estimate a casting posture of a user of the fishing reel from a plurality of casting postures, based on the data of the fishing reel and a model classifying the plurality of casting postures, wherein the casting posture corresponds to the first movement, and wherein the model is stored in the memory; control an operation of the fishing reel based on the casting posture of the user, and transmit data of the casting posture to a separate device.

In some embodiments, the data of the fishing reel in the first movement includes data of three axis angular acceleration of the fishing reel.

In some embodiments, the first movement includes a casting movement of the fishing reel.

In some embodiments, the plurality of casting postures include overhead cast, long distance cast, side cast, flipping, pendulum cast and skipping.

In some embodiments, the data of the casting posture further includes total number of casts, casting distance, casting speed and retrieve speed.

In some embodiments, the computing device being caused to control an operation of the fishing reel includes being caused to implement a braking mode to the fishing reel in the first movement, the braking mode corresponding to the casting posture.

In some embodiments, the computing device being caused to control an operation of the fishing reel includes being caused to generate an alarm, the alarm corresponding to the casting posture.

In some embodiments, the separate device is a mobile device.

Some embodiments provide a method implemented by a fishing reel. The method comprises obtaining data of the fishing reel in a first movement; estimating a casting posture of a user of the fishing reel from a plurality of casting postures, based on the data of the fishing reel and a model classifying the plurality of casting postures, wherein the casting posture corresponds to the first movement; controlling an operation of the fishing reel based on the casting posture of the user, and transmitting data of the casting posture to a separate device.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example embodiment described herein. This disclosure is intended to be read holistically such that any separable features or elements of the disclosure, in any of its aspects and example embodiments, should be viewed as combinable unless the context of the disclosure clearly dictates otherwise.

It will therefore be appreciated that this Brief Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other example embodiments, aspects and advantages will become apparent from the following detailed description taken in conjunction with the accompanying figures which illustrate, by way of example, the principles of some described example embodiments.

BRIEF DESCRIPTION OF THE FIGURE(S)

Having thus described example embodiments of the disclosure in general terms, reference will now be made to the accompanying figures, which are not necessarily drawn to scale, and wherein:

FIG. 4 illustrates a method, according to some embodiments of the present disclosure.

DETAILED DESCRIPTION

Figure 1A:
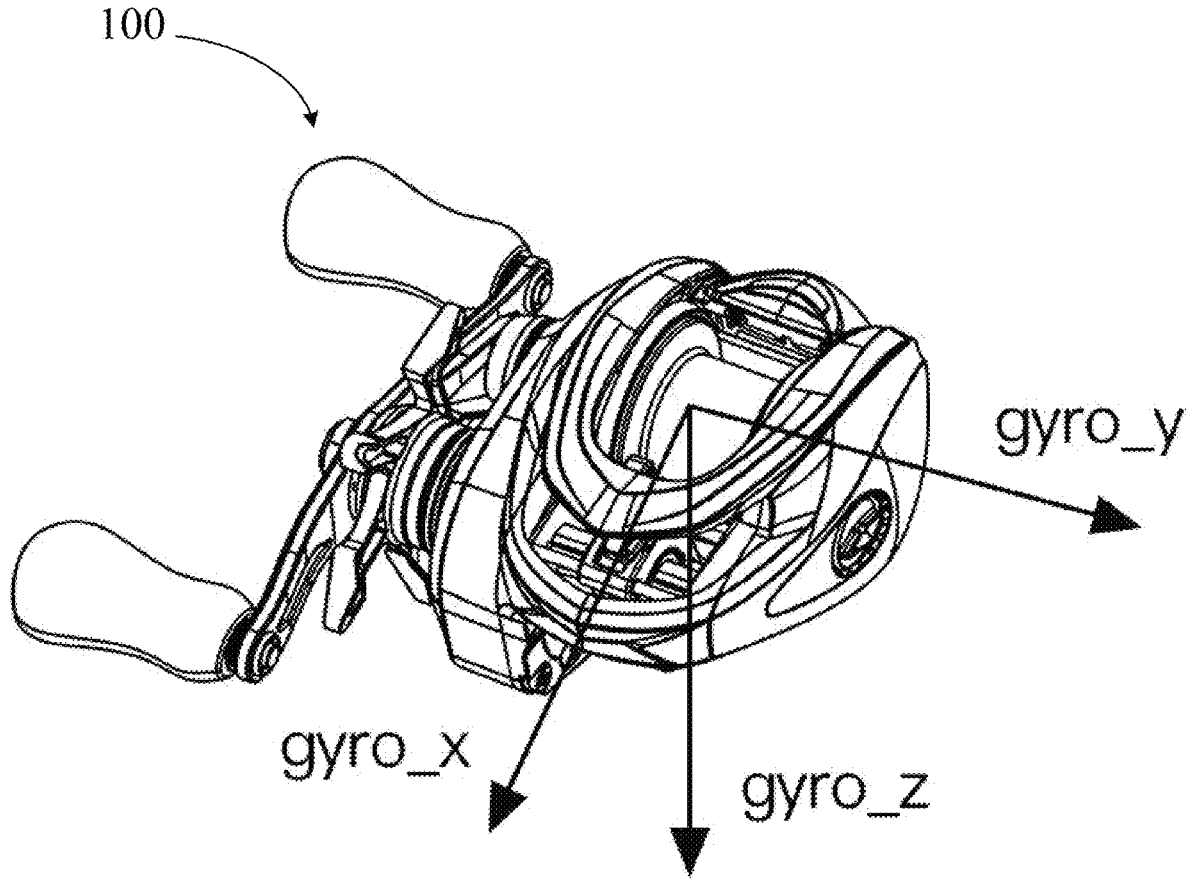
FIGS. 1A and 1B illustrate a fishing reel, according to some embodiments of the present disclosure.

Some embodiments of the present disclosure will now be described more fully hereinafter with reference to the accompanying figures, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Figure 1B:
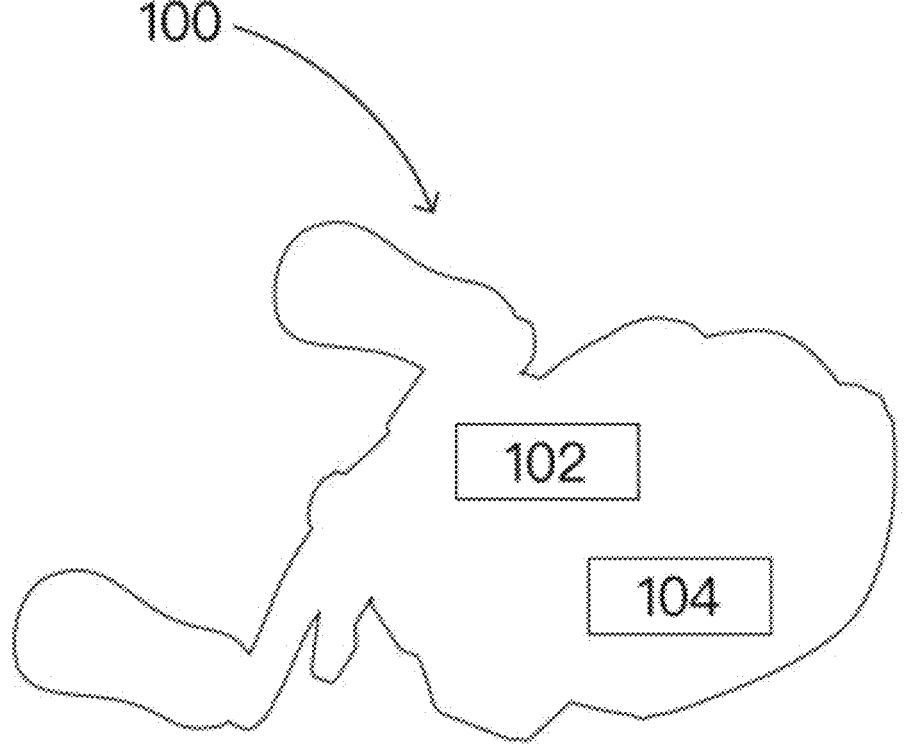

FIGS. 1A and 1B illustrate a fishing reel 100, according to some embodiments of the present disclosure. In FIG. 1A, gyro_x, gyro_y and gyro_z are directions using the fishing reel 100 itself (or the sensor in the fishing reel as explained below) as a reference system. When the fishing reel 100 is laid flat or placed frontally, gyro_x may be the direction of the fishing reel facing forward or is the orientation of the fishing rod, gyro_y may be the direction of the fishing reel perpendicular with gyro_x and facing left, and gyro_z may be the direction of the fishing reel perpendicular with the ground.

As shown in FIG. 1B, in some embodiments, the fishing reel 100 includes one or more sensors 102 and a computing device 104. In some embodiments, the one or more sensors 102 or the computing device 104 may be included inside the fishing reel 100. In some embodiments, the one or more sensors 102 or the computing device 104 may be installed on or attached to the outside surface of the fishing reel 100. In some embodiments, the one or more sensors 102 can communicate data with or transmit data to the computing device 104 through wireless or wired communications. In some embodiments, the computing device 104 may be a Bluetooth chip.

Figure 2:
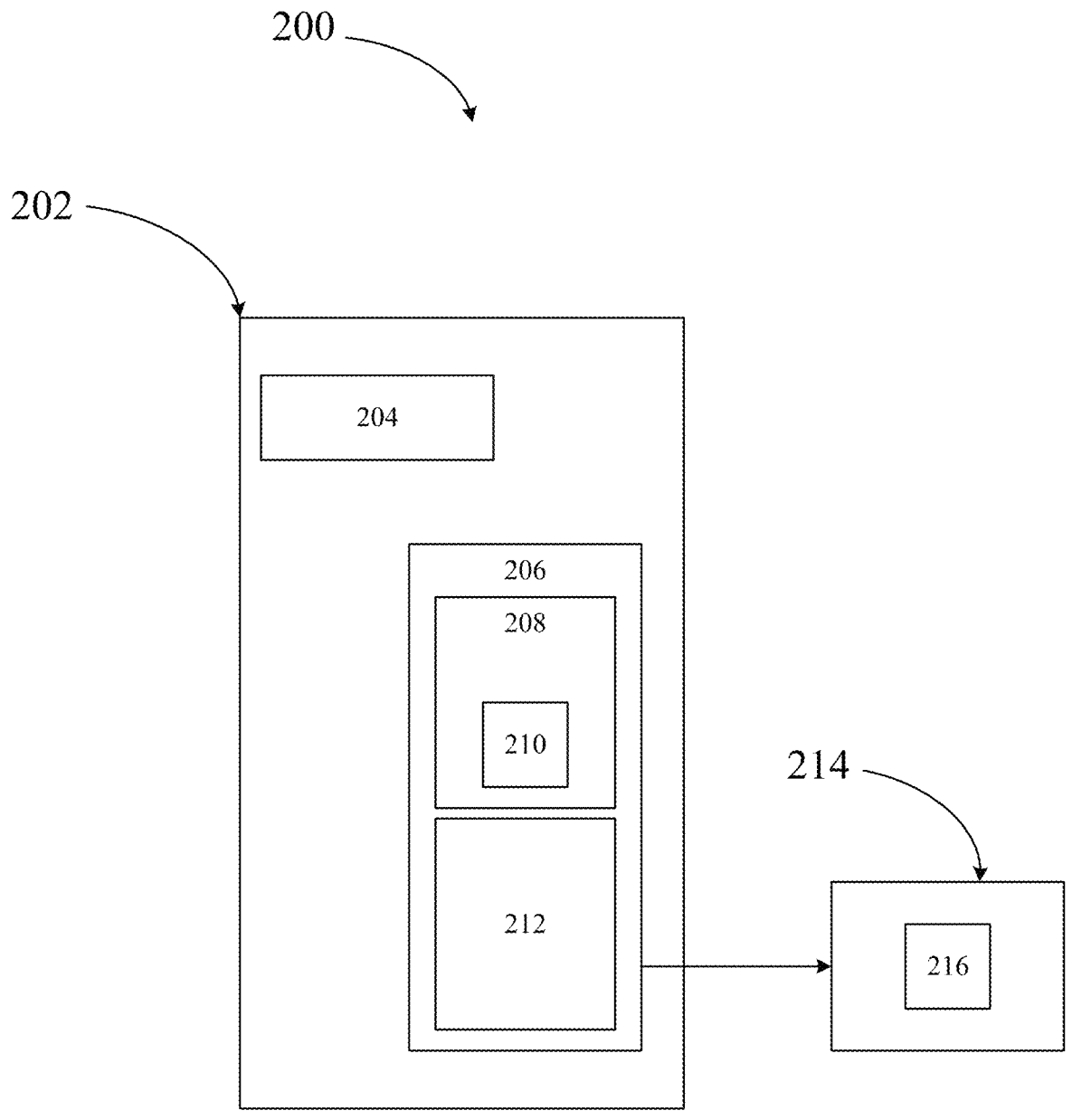
FIG. 2 illustrates a system including a fishing reel and a separate device, according to some embodiments of the present disclosure.

FIG. 2 illustrates a system 200 including a fishing reel 202 and a separate device 214, according to some embodiments of the present disclosure. The fishing reel 202 may correspond to the fishing reel 100 described above in FIGS. 1A and 1B. As shown, the fishing reel 202 includes one or more sensors 204, which may correspond to the one or more sensors 102 described above in FIG. 1B. The fishing reel 202 also includes a processing system 206, which may be implemented by the computing device 104 as described above in FIG. 1B. In some examples, as described in greater detail with reference to FIG. 3, the processing system 206 may be implemented by the computing device 300. The processing system 206 will be described in details below.

In some embodiments, the one or more sensors 204 can obtain data of the fishing reel 200 in a first movement. In some embodiments, the data of the fishing reel 200 in the first movement can include data of three axis angular acceleration of the fishing reel 202. In some embodiments, the data can include data of six axis or nine axis angular acceleration of the fishing reel 202. In some embodiments, the one or more sensors 204 may include one or more accelerometer sensors and/or gyroscopes and/or motion sensors.

In some embodiments, the first movement may be a casting movement of the fishing reel 202, which may be implemented by a user of the fishing reel 202. In some embodiments, the first movement may be another movement such as a retrieve movement of the fishing reel 202.

In some embodiments, through the one or more sensors 204 of the fishing reel 202, motion data generated during a casting process of the fishing reel 202 can be collected. During the whole casting process, the fishing reel 202 is relatively static or in a non-motion stage at the beginning of the casting preparation and the end of the casting stage. The actual casting stage in the middle of the casting process is in a motion stage, which includes the rapid motion of the fishing reel itself (not the line cup in the fishing reel), due to the swinging of the fishing rod by the user. Therefore, the whole casting process can be classified into a motion stage and a non-motion stage. The motion data may correspond to data in the motion stage. The motion data of the fishing reel of the casting movement (i.e., the first movement) can be collected.

In some embodiments, the motion data of the three-axis angular acceleration data may include: forward angular change, reverse angular change, maximum angular acceleration and minimum angular acceleration in the gyro_y direction, and forward angular change, reverse angular change, maximum angular acceleration and minimum angular acceleration in the gyro_z direction.

In some embodiments, the sensors collect three-axis angular acceleration data during the casting process of the fishing wheel, i.e., the data of gyro_x, gyro_y, and gyro_z during the casting process. As explained above with respect to FIG. 1A, gyro_x may be the orientation of the fishing rod, which does not change significantly during the casting process (the fishing reel itself is the reference system), but causes a large change in gyro_y and gyro_z. The values of gyro_y and gyro_z can be used to distinguish between motion stage and non-motion stage. For example, when the absolute value of one of gyro_y and gyro_z is larger than a pre-set sporty value (e.g., 1000), the collected three-axis angular acceleration data can be considered as motion data of the fishing reel.

In some embodiments, the three axis angular acceleration data collected by the sensors may have errors, and a filtering process may be performed to filter the collected data after collection to improve the accuracy of the collected data. The filtering process can be a first-order smoothing filtering.

In some embodiments, the processing system 206 includes an estimation module 208 and a control module 212. The estimation module 208 can estimate a casting posture of a user of the fishing reel 202 from a plurality of casting postures, based on the data of the fishing reel and a model 210 classifying the plurality of casting postures. In some embodiments, the data of the fishing reel are obtained by the one or more sensors 204, as described above. In some embodiments, the estimation module 208 may include the model 210. In some embodiments, the estimated casting posture corresponds to the first movement, e.g., the casting movement of the fishing reel 202.

In some embodiments, the model 210 is a trained classification model. Historical motion data of the fishing reel under different casting postures can be used to perform model parameter training of the classification model. For example, motion data of a prototype of the fishing reel 202 can be collected in advance. Multiple users can use the prototype of the fishing reel with the plurality of casting postures. The multiple users may be professional fishing enthusiasts or anglers who can perform accurate or correct casting postures for the plurality of casting postures.

In some embodiments, the plurality of casting postures include overhead cast, long distance cast, side cast, flipping, pendulum cast and skipping. As understood in the art, overhead cast may be a casting posture requiring holding the rod back over the user's shoulder with the user's fingers on the line cup. Long distance cast may be a casting posture that the user may hold the body of the fishing reel with a hand, move backward, and then throw the fishing reel upward while applying force forward, to increase the distance and power of the throw. Long distance cast may be with a casting distance longer than 30 meters, or longer than 50 meters in some scenarios. Side cast may be a casting posture requiring holding the rod to the left or right of the user in a static grip. Flipping may be a casting posture typically used when the user or angler is close to the target and needs to place the lurez accurately next to an obstacle or in a covered area (e.g., hydrilla or stumps, etc.). Pendulum cast may be a casting posture that utilizes the rod and line to form a pendulum for long distance casting. Skipping may be a casting posture that when the rod tip is thrown downward in a specific way to the water surface, the lure can jump on the surface of the water several times in succession, and reach a certain position to fall into the water.

Motion data of the prototype by the multiple users with the plurality of casting postures can be collected, which constitute historical motion data. The historical motion data can be used to train the classification model in a computer, which may not be the computing device 104. The trained model can be transported and stored in the computing device 104, such as model 210.

In some embodiments, the classification model may be the XGBoost (extreme Gradient Boosting) model. The historical motion data can be first cleaned (e.g., removal of invalid data and classification of valid data) and then valid features (e.g., statistical features and kinematic features) can be extracted. The training process may include selecting 70% of the historical motion data as the training set and 30% of the historical motion data as the testing set, and selecting different model parameters of the XGBoost model (e.g., number of forests, number of trees and depth of trees) for the training. The number of forests may correspond to the number of casting postures. The number of forests may depend on the classification model. The model parameters with the highest accuracy on the testing set can be chosen as the final parameters. Models other than XGBoost model may be used or trained as well.

In some embodiments, the estimation module 208 can estimate the casting posture of the user of the fishing reel 202, based on the motion data of the fishing reel in the casting movement and the trained model 210. For example, the motion data of the three-axis angular acceleration data collected in the casting movement can be fed into the trained XGBoost model for estimation of the casting posture.

In some embodiments, the XGBoost model is a type of tree model whose leaf nodes are the scores of the current tree. The score for a casting posture is the sum of the scores of all trees or forest for that casting posture. The XGBoost model can output a score corresponding to each casting posture of the plurality of casting postures. Based on the scores for each casting posture, the probability of each casting posture can be calculated by a probability calculation formula.

Specifically, in one example, the probability calculation formula is: $p(n)=s(n)/sum(s(0)+ \ldots +s(N))$, where n denotes the n-th casting posture, N denotes the number of all casting postures, $p(n)$ denotes the probability of the n-th casting posture, and $s(n)$ denotes the score of the n-th casting posture. After calculating the probability of each casting posture, the casting posture with the largest probability and satisfying a predetermined threshold is selected as the estimated cast posture of the user in the casting movement.

In some embodiments, the estimation module 208 can provide the estimated casting posture of the user to the control module 212. And the control module 212 can control an operation of the fishing reel based on the estimated casting posture of the user.

In some embodiments, the control module 212 (implemented by the computing device 104) can implement a braking mode to the fishing reel in the first movement. The braking mode may correspond to the estimated casting posture. For example, each casting posture may have a corresponding preset braking mode. The preset braking mode for each casting posture can be pre-collected by using the prototype of the fishing reel 202 and stored in the computing device 104, as described above with respect to pre-collecting historical motion data.

In some embodiments, the brake of the fishing reel 202 may be an electromagnetic brake. After the cast posture of the user in the casting movement is estimated, the control module 212 can send a signal to a MOSFET (Metal Oxide Semiconductor Field Effect Transistor) connected to the brake. The brake may be a coil and the signal to the MOSFET may cause the coil to be closed, e.g., the MOSFET is conducted by the signal. A magnetic field may be generated by the closed coil. During the casting, the line cup of the fishing reel rotates to drive the magnet on the line cup to rotate together. The rotating magnet on the line cup can cut the magnetic field generated by the closed coil, such that the closed coil may generate a current and generate an opposite magnetic field. The opposite magnetic field can reduce the rotation of the line cup to brake the fishing reel until the coil is stopped or not moving. By implementing the braking mode corresponding to the estimated casting posture, line backlash or tangling may be reduced or avoided.

In some embodiments, the control module 212 (implemented by the computing device 104) can generate an alarm to the user based on the estimated casting posture. The alarm may correspond to the estimated casting posture. For example, when the estimated casting posture may damage the casting reel in a fishing scenario, the control module 212 can cause the fishing reel to vibrate or generate a sound or light alarm. In another example, when the estimated casting posture may be a wrong or inaccurate posture in a fishing scenario, the control module 212 can cause the fishing reel to vibrate or generate a sound or light alarm.

Similarly as described above, in some embodiments, the casting postures that may damage the casting reel or the wrong or inaccurate postures can be pre-collected by using the prototype of the fishing reel 202 and stored in the computing device 104. The control module 212 can compare or match the estimated casting posture with the stored postures to decide whether to generate the alarm. In some embodiments, the fishing reel may include a vibrator or a beeper or a light, and the control module 212 can send a signal to the vibrator or beeper or light, to cause the fishing reel to vibrate or generate a sound or light alarm.

In some embodiments, the control module 212 can transmit or provide data of the estimated casting posture to a separate device 214. As described above, the processing system 206 may be implemented by the computing device 104, which may communicate with the separate device 214 through wireless technologies such as WiFi or Bluetooth technologies. The computing device 104 may include WiFi or Bluetooth transmitters and/or receivers and can communicate with the separate device 214.

In some embodiments, the separate device may be a mobile device such as a cell phone. In some embodiments, the separate device may be a wearable device such as a wristband.

In some embodiments, the separate device 214 may include a display 216. The separate device 214 may have an application (App) installed on it. A user can control the fishing reel 202 through the App on the separate device 214. For example, the user can use the App through the display 216 to select an intelligent mode or a manual mode of the fishing reel 202 in the App. The user may use the App to communicate with and control the computing device 104.

In some embodiments, the user can select the intelligent mode of the fishing reel 202 and click or select "start fishing" in the App. In the intelligent mode, after the user starts fishing, the control module 212 or the computing device 104 can control an operation of the fishing reel based on the estimated casting posture of the user automatically as described above, without manual control by the user and without further using the separate device 214 or the App.

In some embodiments, the fishing reel 202 does not need the separate device 214 or the App to control the operation of the fishing reel based on the estimated casting posture. In these embodiments, when the fishing reel has power, the control module 212 or the computing device 104 can implement the braking mode or generate the alarm, based on the estimated casting posture of the user automatically, without the separate device 214 or the App. In some embodiments, the fishing reel may be charged with electricity using a USB interface.

In some embodiments, after the separate device 214 receives the data of the estimated casting posture from the control module 212 or the computing device 104, the separate device 214 through display 216, may display information of the received data of the estimated casting posture to the user, to help improve the user's technique or experience. In some embodiments, the fish reel 100 or 202 may itself include a display to display data of the estimated casting posture to the user.

In some embodiments, the data of the estimated casting posture can include information of which casting posture is the estimated casting posture. And the data of the casting posture may further include additional information, such as total number of casts, casting distance, casting speed and retrieve speed. The total number of casts may be the total number of casts after the user clicks "start fishing" in the App, i.e., the total number of casts in a fishing activity. The casting distance may be the distance of each cast after the user clicks "start fishing" in the App, i.e., the casting distance is a changing value or a real time value for each cast. The casting speed may be the speed of each cast after the user clicks "start fishing" in the App, i.e., the casting speed is a changing value or a real time value for each cast. The retrieve speed may be the speed of each retrieve after the user clicks "start fishing" in the App, i.e., the retrieve speed is a changing value or a real time value for each retrieve.

According to example embodiments of the present disclosure, the processing system 206 and its subsystems including the estimation module 208 and control module 212 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 3:
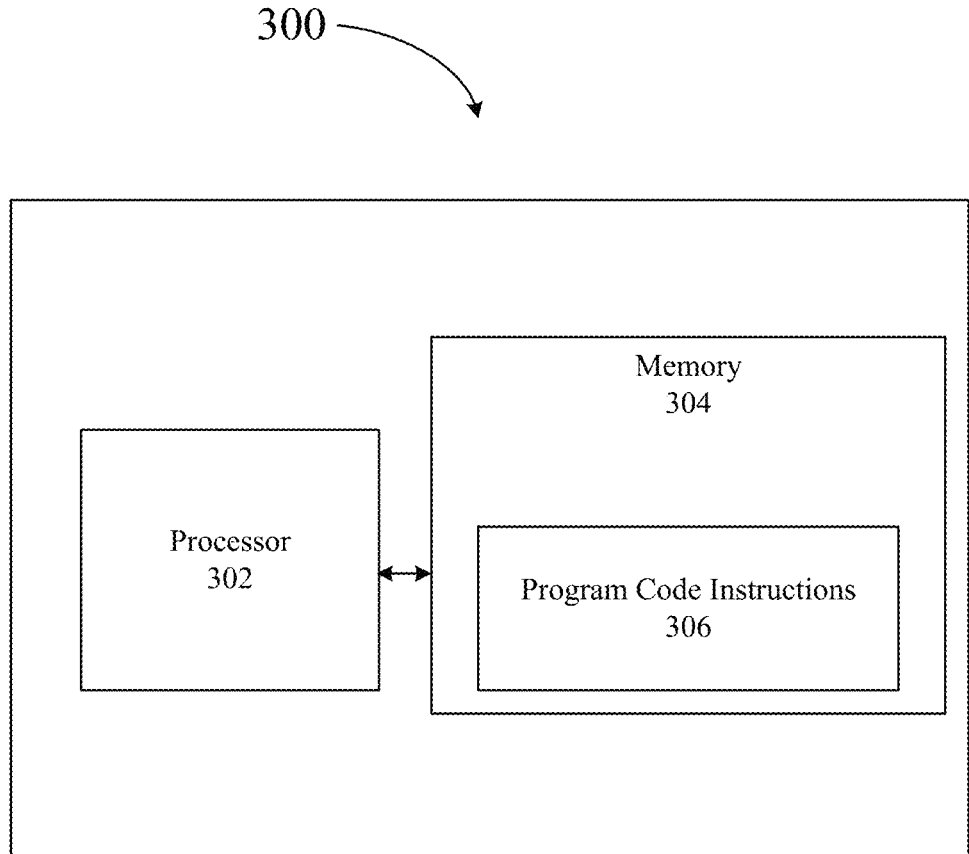
FIG. 3 illustrates a computing device of a fishing reel, according to some embodiments of the present disclosure.

FIG. 3 illustrates a computing device 300, according to some embodiments of the present disclosure. The computing device 300 may correspond to the computing device 104, as descried above in FIG. 1B. The computing device 300 may implement the processing system 206, as descried above in FIG. 2.

As shown in FIG. 3, in some embodiments, the computing device 300 includes a processor 302 and a memory 304 coupled to the processor 302. In some examples, the processor 302 may itself include the memory 304.

In some examples, the processor 302 may be a microprocessor or microcontroller unit (MCU). The processor 302 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 304 (of the same or another apparatus).

The processor 302 may be a number of processors, a multi-core processor or some other type of processor, depending on the particular embodiment. Further, the processor may be implemented using a number of heterogeneous processor systems in which a main processor is present with one or more secondary processors on a single chip. Although the processor may be capable of executing a computer program to perform one or more functions, the processor of various examples may be capable of performing one or more functions without the aid of a computer program. In either instance, the processor may be appropriately programmed to perform functions or operations according to example embodiments of the present disclosure.

In some examples, the memory 304 may be a computer-readable storage medium. The computer-readable storage medium is a non-transitory device capable of storing information, and is distinguishable from computer-readable transmission media such as electronic transitory signals capable of carrying information from one location to another. The memory 304 is generally any piece of computer hardware that is capable of storing information such as, for example, data, computer programs (e.g., computer-readable program code instructions 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. In some embodiments, the trained model 210 classifying the plurality of casting postures described above can be stored in the memory 304.

In some embodiments, the memory 304 stores computer-readable program code instructions 306. The processor 302 is configured to execute computer-readable program code instructions 306 stored in the memory 304. Execution of the program code instructions may produce a computer-implemented process such that the instructions executed by the computer, processor or other programmable apparatus provide operations for implementing functions described herein. Execution of instructions by a processor, or storage of instructions in a computer-readable storage medium, supports combinations of operations for performing the specified functions described herein. It will also be understood that one or more functions, and combinations of functions, may be implemented by special purpose hardware-based computer systems and/or processors which perform the specified functions, or combinations of special purpose hardware and program code instructions.

In some embodiments, the processor 302 is configured to execute computer-readable program code instructions 306 stored in the memory 304, such that the computing device 300 can be caused to estimate a casting posture of a user of a fishing reel from a plurality of casting postures, based on data of the fishing reel in a first movement obtained by one or more sensors and a model classifying the plurality of casting postures, wherein the casting posture corresponds to the first movement, and wherein the model is stored in the memory 304. The computing device 300 can be also caused to control an operation of the fishing reel based on the casting posture of the user, and transmit data of the casting posture to a separate device.

In addition to the memory 304, the processor 302 may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

FIG. 4 illustrates a method 400 implemented by a fishing reel, according to some embodiments of the present disclosure. The fishing reel may be the fishing reel 100 or the fishing reel 202, as described above in FIGS. 1A, 1B and 2. The method 400 may be implemented by a computing device, which may be the computing device 104 or the computing device 300, as described above in FIGS. 1B and 3.

As shown in FIG. 4, at block 402, the method 400 includes obtaining data of the fishing reel in a first movement. At block 404, the method 400 includes estimating a casting posture of a user of the fishing reel from a plurality of casting postures, based on the data of the fishing reel and a model classifying the plurality of casting postures, wherein the casting posture corresponds to the first movement. At block 406, the method 400 includes controlling an operation of the fishing reel based on the casting posture of the user. At block 408, the method 400 includes transmitting data of the casting posture to a separate device.

Many modifications and other embodiments of the disclosure set forth herein will come to mind to one skilled in the art to which the disclosure pertains having the benefit of the teachings presented in the foregoing description and the associated figures. Therefore, it is to be understood that the disclosure is not to be limited to the specific embodiments disclosed and that modifications and other embodiments are intended to be included within the scope of the appended claims. Moreover, although the foregoing description and the associated figures describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A fishing reel, comprising:
one or more sensors configured to obtain data of the fishing reel in a first movement; and
a computing device comprising a memory and a processor, wherein the memory stores executable instructions that, in response to execution by the processor, cause the computing device to at least:
estimate a casting posture of a user of the fishing reel from a plurality of casting postures, based on the data of the fishing reel and a model stored in the memory, wherein the casting posture corresponds to the first movement; and
control an operation of the fishing reel based on data of the casting posture of the user, wherein the data of the casting posture includes total number of casts, casting distance, casting speed and retrieve speed.

2. The fishing reel of claim 1, wherein the data of the fishing reel in the first movement includes data of three axis angular acceleration of the fishing reel.

3. The fishing reel of claim 1, wherein the first movement includes a casting movement of the fishing reel.

4. The fishing reel of claim 1, wherein the plurality of casting postures include all of overhead cast, long distance cast, side cast, flipping, pendulum cast and skipping.

5. The fishing reel of claim 1, wherein the computing device being caused to control an operation of the fishing reel includes being caused to implement a braking mode to the fishing reel, the braking mode corresponding to the casting posture.

6. The fishing reel of claim 1, wherein the computing device being caused to control an operation of the fishing reel includes being caused to generate an alarm, the alarm corresponding to the casting posture.

7. The fishing reel of claim 1, wherein the model is a classification model classifying the plurality of casting postures.

8. A method implemented by a fishing reel, comprising:
obtaining data of the fishing reel in a first movement;
estimating a casting posture of a user of the fishing reel from a plurality of casting postures, based on the data of the fishing reel and a model stored in a memory of the fishing reel, wherein the casting posture corresponds to the first movement; and
controlling an operation of the fishing reel based on data of the casting posture of the user, wherein the data of the casting posture includes total number of casts, casting distance, casting speed and retrieve speed.

9. The method of claim 8, wherein the data of the fishing reel in the first movement includes data of three axis angular acceleration of the fishing reel.

10. The method of claim 8, wherein the first movement includes a casting movement of the fishing reel.

11. The method of claim 8, wherein the plurality of casting postures include all of overhead cast, long distance cast, side cast, flipping, pendulum cast and skipping.

12. The method of claim 8, wherein controlling an operation of the fishing reel includes implementing a braking mode to the fishing reel, the braking mode corresponding to the casting posture.

13. The method of claim 8, wherein controlling an operation of the fishing reel includes generating an alarm, the alarm corresponding to the casting posture.

14. The method of claim 8, wherein the model is a classification model classifying the plurality of casting postures.

\* \* \* \* \*